United States Patent

[11] 3,582,840

| [72] | Inventor | Adrian J. DeVries<br>Elmhurst, Ill. |
|---|---|---|
| [21] | Appl. No. | 808,920 |
| [22] | Filed | Mar. 20, 1969 |
| [45] | Patented | June 1, 1971 |
| [73] | Assignee | Zenith Radio Corporation<br>Chicago, Ill.<br>Continuation-in-part of application Ser. No. 721,038, Apr. 12, 1968, which is a continuation-in-part of application Ser. No. 582,387, Sept. 27, 1966, now abandoned. |

[54] ACOUSTIC WAVE FILTER
14 Claims, 14 Drawing Figs.

[52] U.S. Cl. ..................................................... 333/72, 333/30
[51] Int. Cl. ...................................................... H03h 9/20, H03h 9/30
[50] Field of Search .......................................... 333/30, 72; 315/3; 330/5.5; 310/8; 340/16

[56] References Cited
UNITED STATES PATENTS

| 3,360,749 | 12/1967 | Sittig ............................ | 333/30 |
| 3,289,114 | 11/1966 | Rowen ......................... | 333/30 |
| 3,283,264 | 11/1966 | Papadakis ..................... | 333/72 |
| 3,401,360 | 9/1968 | Schulz-Dubois.............. | 333/30 |
| 3,446,975 | 5/1969 | Adler ........................... | 250/211 |

Primary Examiner—Herman Karl Saalbach
Assistant Examiner—C. Baraff
Attorney—Francis W. Crotty ABSTRACT: A body of piezoelectric material propagates acoustic surface waves. A central transducer is coupled to a surface of the body to interact with those waves. Spaced on the same surface generally symmetrically individually with respect to that central transducer are a pair of outer transducers. Each of the three transducers includes interleaved combs of conductive electrodes that are spaced apart effectively by one-half the approximate wavelength of the surface waves. The combs of the outer transducers are mutually arranged, relative to the central transducers, such that surface waves propagating between the central and one of the outer transducers create electrical signals additively related in phase to electrical signals created by surface waves propagating between the central and the other outer transducers. In the several illustrated species, the specific arrangement of the different combs varies in dependence upon the number of individual comb electrodes in the different transducers and the choice as between series or parallel interconnection of the outer transducers.

PATENTED JUN 1 1971
3,582,840
SHEET 1 OF 3
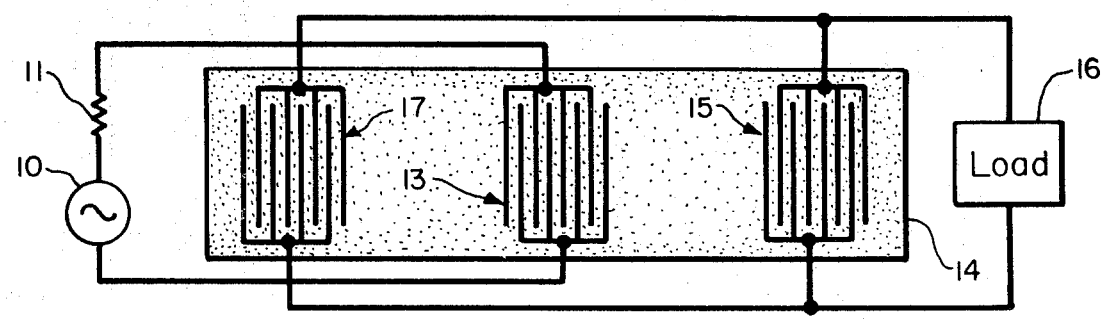
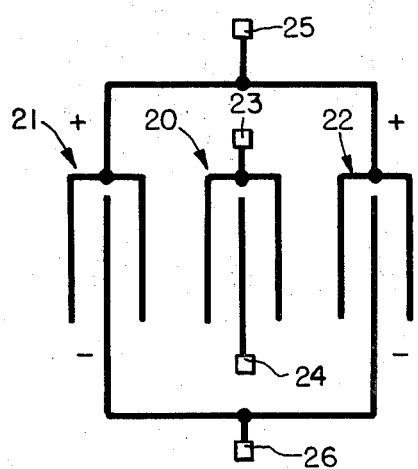
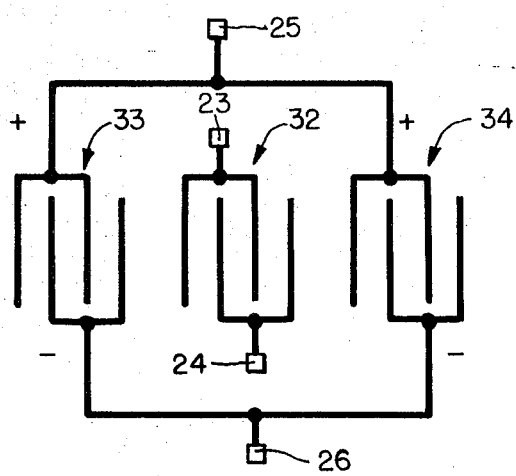
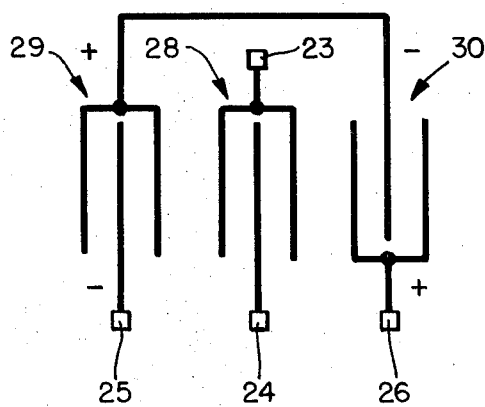
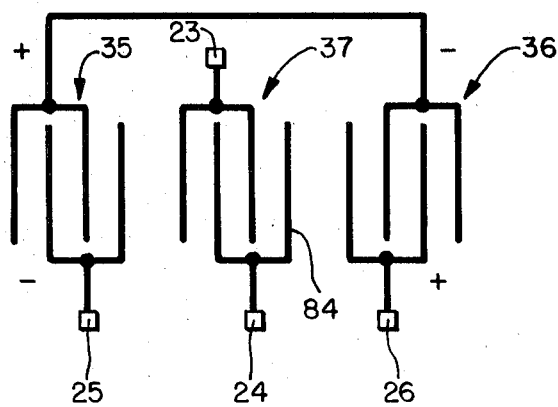
Inventor
Adrian J. De Vries
By *Francis W. Crotty*
Attorney 3,582,840

Inventor
Adrian J. De Vries

By Francis W. Crotty
Attorney

Inventor
Adrian J. DeVries

By Francis W. Crotty
Attorney 3,582,840

1

ACOUSTIC WAVE FILTER

This application is a continuation-in-part of copending application Ser. No. 721,038, filed Apr. 12, 1968 which in turn is a continuation-in-part of a now-abandoned parent application Ser. No. 582,387, filed Sept. 27, 1966, all of which applications are assigned to the present assignee.

BACKGROUND TO THE INVENTION

This invention pertains to acoustoelectric filters. More particularly, it relates to solid-state tuned circuitry which involves interaction between a transducer coupled to a piezoelectric material and acoustic waves propagated in that material.

In copending application Ser. No. 721,038 there are disclosed and claimed a number of different acoustoelectric devices in which acoustic surface waves propagating in a piezoelectric material interact with transducer coupled to the surface waves. In each of the devices particularly disclosed in that application, the surface waves launched in the body of piezoelectric material are caused, in one manner or another, to interact with at least a second transducer spaced along the surface from the first. In the simplest case, the first transducer is coupled to a source of signals while the second transducer is coupled to a load, the signal energy being translated by the acoustic waves between the two transducers.

In this simplest version, the transmitting transducer actually launches surface waves in opposing directions. Since only one of those two wave trains is sent toward the receiving transducer, the filter has a theoretical minimum loss of 6 db., three of which is assigned to the transmitter and three to the receiver. Several ways of improving that insertion loss are disclosed in the aforesaid copending application. In one such approach, a third transducer is disposed on the side of the first or transmitting transducer opposite the second-mentioned transducer. This additional transducer, then, is in a position to intercept the other of the launched wave trains. As a result, the theoretical minimum insertion loss is reduced to 3 db.

In practice, such devices have been demonstrated to exhibit characteristics useable in a number of different applications. In a television receiver, for example, acoustic filter systems may be included in the IF channel in order to impose a desired IF characteristic with traps or null points at selected frequencies spaced from the IF carrier frequencies and determined by the structure of the acoustic filters included in the system. As another example, an acoustic filter system may serve in an FM receiver as the discriminator to perform the necessary function of converting frequency changes to amplitude changes.

The demonstrations thus far have been highly encouraging. A complete three-transducer filter has been deposited upon a substrate only 0.040 inch thick and in the shape of a rectangle 0.250 by 0.180 inch. To facilitate input and output connections to this extremely small stage of integrated circuitry, it has been found convenient to deposit the comb electrodes along with electrically connected conductive areas of "landing pads" to which external contacts or leads may be joined. MOreover, where two or more of the transducers are to be mutually interconnected, it is also desirable to "print" or deposit the necessary interconnecting lead elements as part of the same process.

It is a general object of the present invention to provide a new and improved acoustic filter in which two or more comb-type transducers are mutually interconnected in a manner that eliminates or minimizes the number of connecting leads that must cross one another.

Another object of the present invention is to provide such a filter in which the interaction efficiency is enhanced while maintaining the correct phase relationship with respect to those of the transducers that are mutually interconnected.

A further object of the present invention is to achieve the foregoing ends in a manner particularly adaptable to conventional techniques of integrated-circuit fabrication.

2

SUMMARY OF THE INVENTION

An acoustic filter to which the invention pertains has an acoustic-wave-propagating medium. A central surface-wave transducer is actively coupled to a first surface portion of that medium. A pair of outer surface-wave transducers likewise are actively coupled to respective second and third portions of that surface which are individually spaced respectively in opposite directions from the first portion. Each of the transducers includes interleaved combs of conductive electrodes mutually spaced apart effectively by one-half the approximate wavelength of transmitted signals. In accordance with the invention, this combination comprises means for interconnecting the outer transducers together with means for coupling input and output signals to and from the transducers. Finally, the combs of the outer transducers are mutually arranged, relative to the central transducer, such that surface waves propagating between the central transducer and one outer transducer create electrical signals that are cumulatively phase-correlated with electrical signals created by surface waves propagating between the central transducer and the other outer transducer.

The features of the present invention which are believed to be novel are set froth with particularity in the appended claims. The organization and manner of operation of the invention, together with further objects and advantages thereof, may best be understood by reference to the following description taken in conjunction with the accompanying drawings, in the several figures of which like reference numerals identify like elements and in which:

FIG. 1 is a partly schematic plan view of one embodiment of an acoustic filter system;

FIGS. 2, 4, 6 and 8 are schematic diagrams of individually different acoustic filter systems in which separate transducers are interconnected in parallel;

FIGS. 3, 5, 7 and 9 are schematic diagrams of acoustic filter systems in which separate transducers are interconnected in series;

Figure 6:
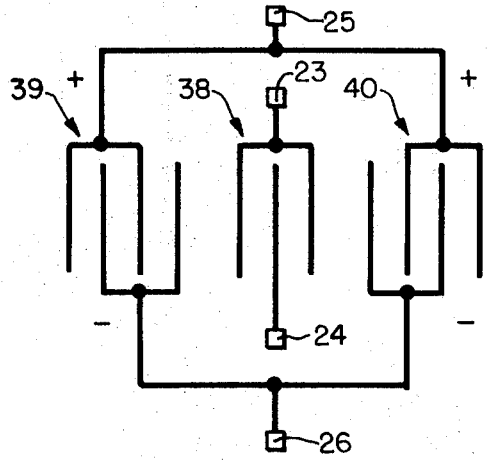

FIG. 1, a signal source 10 in series with a resistor 11, which may represent the internal impedance of that source, is connected across an input surface-wave transducer 13 mechanically coupled to one major surface of a body of piezoelectric material in the form of a substrate 14. An output or second portion of the same surface of substrate 14 is, in turn, mechanically coupled to an output transducer 15 across which a load 16 is coupled. Another output or third portion of that same surface of substrate 14 is mechanically coupled to still another output transducer 17 across which load 16 also is coupled, and, therefore, transducer 17 is in parallel with transducer 15.

In terms of numbers of electrodes, electrode spacing and overall size, transducers 13, 15 and 17 are herein illustrated as being identical and are each constructed of two comb-type electrode arrays. However, the electrode spacing of the central transducer may be different from that of the outer transducers without changing the basic mode of operation to be described. In each array, the stripes or conductive elements of one comb are interleaved with the stripes of the other. The electrodes are of a material such as gold or aluminum which may be vacuum deposited on a highly lapped and polished planar surface of the piezoelectric body. The piezoelectric material is one, such as PZT or quartz, that is propagative of acoustic waves. The distance between the centers of two consecutive stripes in each array is one-half the acoustic wavelength of the signal wave for which it is desired to achieve maximum response.

Direct piezoelectric surface-wave transduction is accomplished by the spatially periodic interdigital electrodes or teeth of transducer 13. Considering this device as a transmitter, a periodic electric field is produced when a signal from source 10 is fed to the electrodes and, through piezoelectric coupling, the electric signal is transduced to traveling acoustic surface waves on substrate 14. These occur when the strain components produced by the electric field in the piezoelectric substrate are substantially matched to the strain components associated with the surface-wave mode. The surface waves propagate in opposing directions away from transducer 13 and individually toward respective transducers 15 and 17.

Source 10, for example a portion of a television receiver, produces a range of signal frequencies, but due to the selective nature of the arrangement only a particular frequency and its intelligence-carrying sidebands are converted to surface waves. More specifically, source 10 may be the tunable front end of a television receiver which selects a desired program signal for application to load 16. In this environment, load 16 comprises those stages of a television receiver subsequent to the IF selector that respond to the program signal and produce a television image and its associated audio program. The surface waves resulting in substrate 14 in response to the energization to transducer 13 by the IF output signal from source 10 are translated in the two directions along the substrate to output transducers 15 and 17 where they are converted to respective electrical output signals which are applied in parallel to load 16.

In a typical television IF embodiment, utilizing PZT as the piezoelectric substrate, the stripes of each of transducers 13, 15 and 17 are approximately 0.5 mil wide and are separated by 0.5 mil for the application of an IF signal in the typical range of 40—46 megahertz. The spacing between transducer 13 and each of the other two transducers is on the order of 0.05 inch and the widths of the wave fronts are approximately 0.1 inch. This structure of the transducers and the substrate acts as a cascaded set of two tuned circuits with a resonant frequency of approximately 40 megahertz, the resonant frequency being determined, at least to the first order, by the spacing of the stripes.

As indicated, the potential developed between any given pair of successive stripes in electrode array 13 produces two waves traveling along the surface of substrate 14, in opposing directions perpendicular to the stripes for the typical isotropic case of a ceramic poled perpendicularly to the surface. When the distance between the stripes is one-half of the acoustic wavelength of the waves at the desired input frequency, or is an integral multiple thereof, relative maxima of the output waves are produced by piezoelectric transduction in transducers 15 and 17. For increased selectivity, additional electrode stripes are added to the comb patterns of devices 13, 15 and 17. Further modifications and adjustments are described in the aforementioned copending application for the purpose of particularly shaping the response presented by the filter to the transmitted signal. Also, certain uses may involve the combination of transducers 15 and 17 as interconnected input transducers, in which case interaction device 13 serves as an output transducer. Moreover, as disclosed and claimed in copending application Ser. No. 817,093, filed Apr. 17, 1969, the entire region of substrate 14 need not be piezoelectric; it is sufficient, and sometimes desirable, to have the piezoelectric property exhibited only directly under the comb arrays.

In FIG. 1, the leads interconnecting transducers 15 and 17 are schematically indicated as if they might be separate external wires directly connected to the different electrode combs, source 10 and load 16 being similarly connected. While this is possible, it is preferred to deposit as much of the interconnecting circuitry as feasible directly upon the surface of substrate 14. In general, one aim is to make all interconnecting lead lengths as short as possible in order to minimize the inductance presented by those leads. At the same time, it is also desirable to so arrange the leads to minimize interarray capacitance. To the latter end, and also for the purpose of permitting disposition of the interconnecting leads in the same manufacturing operation during which the transducer electrodes themselves are deposited, it is highly advantageous to arrange the patterns of the electrode arrays and leads so as to avoid, wherever possible, the use of any leads that cross one another.

As previously mentioned, the use of a generally symmetrical configuration of three transducers as shown in FIG. 1 is advantageous in that it reduces the minimum insertion loss by 3 db. as compared with a simpler filter employing but two transducers. Another advantage in utilizing a combination of a pair of interconnected transducers is that a choice is offered the designer in the magnitude of impedance offered by that pair cooperating together. That is, the impedance presented by a combination of electrode arrays varies in accordance with the number of such arrays connected in series or parallel. Thus, in FIG. 1 a typical comb-type array like that of any of transducers 13, 15 and 17 deposited on PZT has an impedance of approximately 200 ohms. By interconnecting transducers 15 and 17 in parallel as shown, the impedance as seen by load 16 is halved, or, in the example, would be approximately 100 ohms. On the other hand, by modifying the interconnections illustrated in FIG. 1 to connect transducers 15 and 17 in series, the impedance which would be presented to load 16 in the example becomes 400 ohms.

In order to obtain proper and optimum performance of the three-array filter, the distances between the central array and the two outer arrays as well as the arrangement of the arrays themselves are chosen to obtain constructive adding of the signal energy. That is, not only are transducers 15 and 17 individually disposed respectively on portions of the substrate surface that are generally symmetrical with respect to the portion occupied by transducer 13, but the individual comb electrodes or teeth are precisely disposed in order to obtain cumulative phase correlation of the electrical signals created on the electrodes of the two different arrays 15 and 17. Moreover, the mutual orientation of the different arrays is selected in accordance with the number of individual electrode teeth in each array and also in accordance with whether the filter is to be operated with the outer arrays 15 and 17 connected in series or parallel to the end that there is achieved for each particular arrangement of the different arrays the previously expressed conditions of permitting simplified external connections, enabling short and direct connections and avoiding the crossing of interconnecting leads as much as possible.

More specifically, FIG. 2 represents a pattern of arrays 20, 21 and 22 in which outer lengths 21 and 22 are connected in parallel and all three of the arrays are composed of an odd number of electrodes, three in each array in this illustrative case. To facilitate external connection, transducer 20 has its opposing electrodes connected directly to individual conductive areas 23 and 24 located respectively on opposite sides of transducer 20. In practice, conductive areas 23 and 24, to which external leads or contacts are joined, are deposited upon the piezoelectric substrate simultaneously with the deposition of the comb arrays and the leads connecting those arrays to the conductive areas. Similarly, and also disposed respectively on opposite sides of the pattern of arrays, conductive areas 25 and 26 are deposited upon the substrate together with leads connecting them directly to transducers 21 and 22 in a manner such that the latter are connected in parallel. Thus, the entire pattern of arrays, together with the interconnecting leads and the externally conductive areas, are disposed with emphasis upon the attainment of short lead lengths and without the crossing of any of the leads.

A brief inspection of FIGS. 3—9 will reveal that the different patterns in those figures are likewise disposed so that short lead lengths are featured and the crossing of leads is completely avoided. However, a comparison of each of those other figures with FIG. 2 and with each other will reveal that the individual electrode configurations of different ones of the arrays are different as between the various figures. This arises because of the need to obtain constructive addition of the signals developed on the two outer arrays while yet achieving the desired ends of short lead length and minimal or no lead crossing. In all of these figures, it is assumed for simplicity of explanation that the central array is coupled to an input source to serve as the transmitter and that the outer arrays serve as receivers feeding a load. However, the input source and the load may be reversed in a given utilization.

FIGS. 2, 4, 6 an 8 all depict filters wherein the two outer transducers are connected in parallel. ON the other hand, FIGS. 3, 5, 7 and 9 illustrate filters in which the outer transducers are connected in series. For cases in which the two outer patterns in each case have the same number of electrodes, FIGS. 2—9 set forth all possible basic electrode combinations for both series and parallel coupling of the outer patterns or arrays whether such arrays individually have an odd or even number of electrode elements For convenience, the drawing illustrates arrays of three or four electrodes.

Looking first at just the nature of the physical differences in the various configurations, FIG. 3 is similar to FIG. 2 in that in each case the three arrays have an odd number of electrodes. In the series case of FIG. 3, however, array 30 is inverted relative to array 22 of FIG. 2, whereas arrays 28 and 29 are oriented the same as corresponding arrays 20 and 21 of FIG. 2. Viewed another way, outer arrays 21 and 22 of FIG. 2 have the same orientation, while outer arrays 29 and 30 of FIG. 3 are mutually inverted.

Arrays 32, 33 and 34 of FIG. 4 and arrays 35, 36 and 37 of FIG. 5 all have an even number of electrodes. As between these two figures, the center arrays 32 and 37 and outer arrays 33 and 35 at one end of the filters are similarly oriented. The remaining outer arrays 34 and 36 are mutually inverted. Viewed differently for the parallel case of FIG. 4 outer arrays 33 and 34 are oriented the same, while for the series case of FIG. 5 outer arrays 35 and 36 are mutually inverted.

Figure 7:
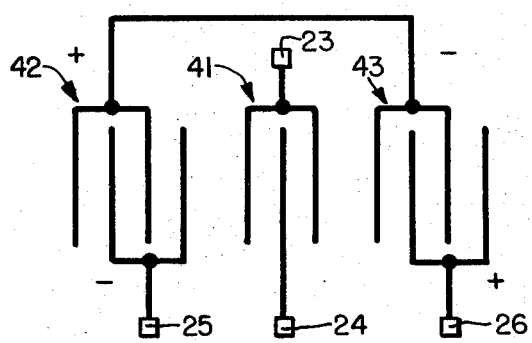

FIGS. 6 and 7 feature central arrays 38 and 41 having odd number of electrodes, but respective outer arrays 39, 40 and 42, 43 have an even number of electrodes. As before, the respective arrays are oriented the same except that outer arrays 40 and 43 at one end of the filters are mutually inverted. Here, outer arrays 39 and 40 of the parallel case of FIG. 6 are mutually inverted, while outer arrays 42 and 43 of the series case of FIG. 7 are oriented alike.

Figure 8:
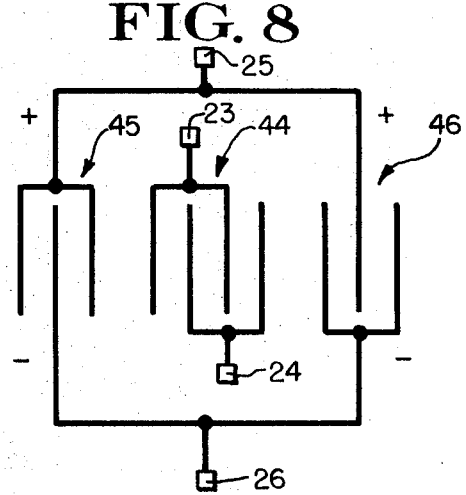
Figure 9:
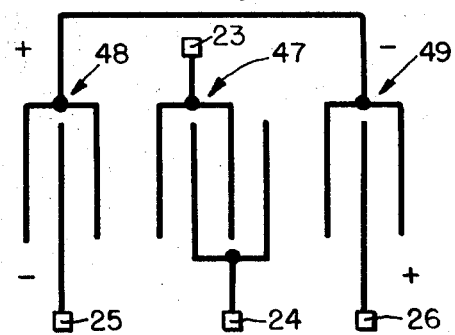

FIGS. 8 and 9 illustrate the reverse situation in which the respective central arrays 44 and 47 have an even number of electrodes while the outer arrays 45, 46 and 48, 49 have an odd number of electrodes. Again, the respective arrays are similarly oriented but for the mutual inversion of outer arrays 46 and 49 at one end of the filters. As in the arrangements of FIGS. 6 and 7, outer arrays 45 and 46 of the parallel case shown in FIG. 8 are mutually inverted, and outer arrays 48 and 49 of the series case shown in FIG. 9 have the same orientation.

Returning now to FIG. 2 for an explanation of its operation, it is assumed that an alternating-current signal potential is applied between terminals 23 and 24. Assuming that the signal frequency is within the frequency-response range of array 20, two surface waves are generated in response to the applied signal potential, one traveling to the left toward array 21 and the other traveling to the right toward array 22. These two waves have the same phase at points which are located symmetrically to the left and to the right of array 20 because of the symmetry of the array. Consequently, with arrays 21 and 22 spaced symmetrically from array 20, the two waves induce potentials having the same amplitude and phase in each of these two outer arrays. The plus and minus signs adjacent to outer arrays 21 and 22 indicate an assumed positive direction of induced signal potential. Since the potentials across arrays 21 and 22 are equal and of like-oriented phase, the array patterns may be conveniently connected in parallel by two short conductors deposited directly upon the substrate.

Optimum performance calls for identical physical spacing of outer arrays 21 and 22 individually from central array 20, since whatever surface-wave attenuation occurs will then be the same for the two oppositely directed waves because they travel the same distances in arriving at the outer arrays. When an imbalance between the amplitudes of those two waves may be tolerated, or for a given application is desired, the same parallel phase condition exists when the outer transducers are unequally spaced physically from the center transducer but with the difference between those two spacings equal to an integral number of surface-wave wavelengths. In that case, the outer transducers still have electrical symmetry in terms of phase with respect to the central transducer, although the amplitudes are different because of the difference in attenuation effected by the inequality of distances of wave travel.

It is also instructive to note that displacement of transducer 22 one-half surface wavelength from its described position, in either direction along the axis of surface wave propagation, would result in reversing the relative polarity of the signal developed across it. In such a case, in order to achieve parallel coupling of outer transducers 21 and 22 it would then be necessary to interconnect diagonally opposite points of the overall pattern with a resulting undesirable increase in lead lengths and areas. On the other hand, such a one-half wavelength displacement of one transducer relative to the other causes the respective polarities developed across the two outer transducers to be of such relative phase as to permit direct and simple series interconnection of the outer transducers generally in the manner of FIG. 3. Again, however, inequality exists in the signal amplitudes developed across the respective outer transducers because of the difference in path lengths of the two surface waves in reaching these transducers. This discussion of the changed conditions which ensue when departing from strict physical symmetry will be found to be identically or analogously applicable also to FIGS. 3—9. Consequently, it will be unnecessary to mention such possible modifications further when hereinafter specifically explaining the operation of the filters of those other figures.

Comparing FIGS. 2 and 3, it will be observed that the individual electrode locations along the path of surface wave propagation are the same in both figures. Consequently, for the same signal potential applied to terminals 23, 24, the response of transducers 29 and 30 is of equal amplitude but opposed polarity simply because of the inversion that has been made in the connections to transducer 30. Accordingly, outer arrays 29 and 30 of FIG. 3 are suitable for series interconnection by the use of a single, short connecting lead as illustrated.

Attention is next directed to FIG. 6 which may be explained by the same analysis used in connection with FIG. 2. Specifically, in response to an applied signal potential, array 38 generates two surface waves, one traveling to the left and the other to the right and their phases are identical at equal distances to the left and right of array 38. With arrays 39 and 40 physically positioned symmetrically with respect to array 38, the potentials induced by the two traveling surface waves are of like phase and equal amplitude and parallel interconnection of these outer arrays is achieved by means of minimal-length conductive leads deposited along either side of the substrate.

FIG. 7 differs from FIG. 6 in the same manner that FIGS. 3 and 2 differ from one another. In particular array 43 has been inverted compared with array 40, while retaining the same location of the individual electrodes, and causing the polarity of the signal induced across array 43 to be opposite that developed across array 42. Hence, the respective signal polarities of the outer arrays are appropriate for series interconnection by the use of a single short conductive lead as shown.

Because in each of FIGS. 2, 3, 6 and 7 the central array has an odd number of electrodes, the two oppositely directed outgoing surface waves have the same phase at points which are located the same distance away from the central array, as already indicated. In FIGS. 4, 5, 8 and 9, however, the central arrays have an even number of electrodes as a result of which the two oppositely directed waves are launched in counterphase and are in counterphase at points that are located the same physical distances to the left and right of the central pattern, the reference of course being from the center of the central array. This difference in phase relation leads directly to a change in the mutual orientation of the outer arrays in order to obtain conditions that are analogous to those of FIGS. 2, 3, 6 and 7.

For example, comparing the parallel arrangements of FIGS. 2 and 8, in each of which the outer arrays have an odd number of electrodes, the outer arrays in FIG. 8 are mutually inverted whereas in FIG. 2 they have the same orientation. Similarly, comparing the parallel-connected embodiments of FIGS. 4 and 6, wherein the outer arrays have an even number of electrodes, the outer arrays in FIG. 4 have the same orientation while those of FIG. 6 are mutually inverted. Similar reversals of outer-array mutual orientation will be found between the series-connected examples of FIGS. 3 and 9 and of FIGS. 5 and 7. In each instance, the difference in arrangement stems directly from the difference phase relation as between the two surface waves propagated away from the central array.

Figure 10:
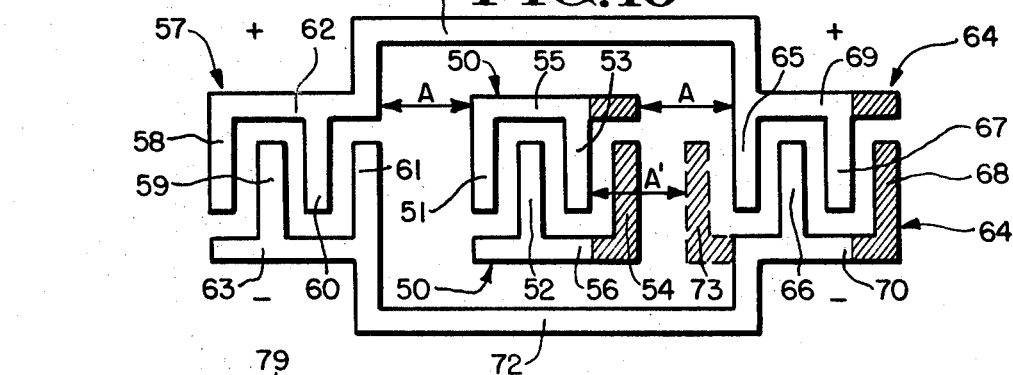
FIGS. 10 and 11 are plan views of electrode layouts useful in explaining the operation of others of the FIGS.

It is of further instructional value to analyze the operation of the FIG. 4 filter from a somewhat different viewpoint. In this connection, and for a moment ignoring its dashed-line modification, FIG. 10 represents the filter of FIG. 4 redrawn to display the different electrodes and interconnecting leads as they typically appear in actual practice wherein the widths of the electrodes and leads are comparable with the spacings involved. Thus, the filter of FIG. 10 includes an input transducer 50 having interdigital electrodes 51, 52, 53 and 54 together with interconnecting leads 55 and 56. Spaced to one side of transducer 50 by a distance A is a first outer array 57 composed of electrodes 58, 59, 60 and 61 and their associated interconnecting leads 62 and 63. Symmetrically spaced by the same distance A on the opposite side of transducer 50 is another outer array 64 that similarly includes its individual electrodes 65, 66, 67 and 68 together with their connecting lead 69 and 70. Consistent with parallel operation of the outer arrays, a conductive element 71 interconnects leads 62 and 69, while another conductive element 72 similarly interconnects leads 63 and 70. For convenience of explanation, it is again assumed that all three arrays are constructed with identical interleaved combs. Similarly, it is assumed that the signal applied across transducer 50 is of an appropriate frequency such that the wavelength of the associated surface waves is identical to twice the center-to-center spacing of adjacent teeth in the combs.

As before, application of the signal across transducer 50 creates two surface waves one of which travels to the left and the other to the right. It is next assumed that the wave traveling to the left interacts with transducer 57 and, at a given instant, effects the development across that transducer of a signal having a polarity as indicated by the plus sign at the top adjacent to lead 62 and the minus sign at the bottom adjacent to lead 63. Of interest is whether a corresponding polarity orientation exists across transducer 64 so as to be consistent with the interconnection of transducers 57 ad 64 in parallel by means of elements 71 and 72.

It will be observed that the total amplitude and phase of the waves developed by central transducer 50 is a summation of the effects of all of the individual transducer elements formed by each set of adjacent conductive stripes or electrodes of that transducer. For this simplified case where the wavelength is identical to twice the center-to-center spacing of the stripes, the contributions of these individual transducers all have the same phase. The deletion of any one individual contribution, therefore, has no effect upon the phase of the total signal represented by the traveling waves. Consequently, no change in the phase of the generated waves occurs when electrode 54 (and the overlapping portions of leads 55 and 56) is removed as indicated by the shaded areas of transducer 50 in FIG. 10. For discussion purposes, this transducer as so modified is denominated 50* hereinafter.

A similar situation exists with respect to transducer 64. The signal potential induced in that transducer does not change in phase when electrode 68 (together with the overlapping portions of leads 69 and 70) is removed as also indicated by the shaded lines. Analogously, the phase of the potential developed across transducer 64 likewise does not change by the addition thereto of a properly spaced electrode 73 on the side toward transducer 50, as indicated by the dashed lines enclosing the additional shaded area shown in FIG. 10. Again for convenience, the array obtained by adding electrode 73 and deleting electrode 68 is denominated 64*. The amplitude and phase of the signal potential induced in arrays 64 and 64* will be the same, because the phase-determining positions of the electrodes in transducer 64* are not effectively changed and the distance A', between central transducer 50* and modified transducer 64*, remains the same as the original distance A.

As so modified, the filter of FIG. 10 is now identical with that of FIG. 6. In analyzing the latter, it was found that the potentials induced across arrays 39 and 40 were identical both in amplitude and phase so as to be consistent with parallel interconnection. Hence, transferring that result to the identical combination of arrays 50*, 57 and 64*, and then from that to the fully equivalent original combination of FIG. 10 composed of arrays 50, 57 and 64, demonstrates that the arrangement of FIG. 4 (from which FIG. 10 was drawn) is that which is required for parallel interconnection of the outer arrays when there is an even number of electrodes both in the central and outer arrays.

Figure 11:
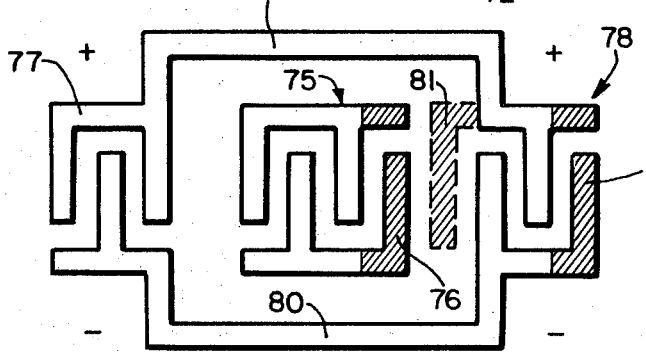

Similarly to the case of FIG. 10 and its relationship to FIG. 4, FIG. 11 represents a typical pattern layout corresponding to the filter of FIG. 8. Included in FIG. 11 is a central array 75 composed of four electrodes the right-hand one of which is denominated 76. Spaced to the left of the central array is one outer array 77 and to the right is the other outer array 78 interconnected in parallel with array 77 by conductive elements 79 and 80. Upon the application of a signal of design-center frequency to array 75, it is assumed that the phase of the signal induced across transducer 77 establishes a polarity having a positive direction as indicated by the plus and minus signs.

In the same way as explained in connection with FIG. 10, the deletion from transducer 75 of electrode 76 does not in any way affect the phase of the surface waves traveling away from that transducer. Similarly, the inclusion of an additional electrode 81 on the inner side of transducer 78 and properly spaced, while deleting its outer electrode 82, effects no change in the phase of the signal developed across transducer 78. The amplitude of that signal likewise is not changed by this modification because the spacing of transducer 78 (as so modified) from transducer 75 (as it is so modified) remains the same as it was before these modifications were made. Noting now that filter 11 has become identical to that of FIG. 2, the previous analysis of that earlier figure demonstrates that the phase of the signals induced in transducers 77 and 78, and hence in transducers 45 and 46 of FIG. 8, are the same as indicated by the like orientation of the indicated polarities. Accordingly, arrays 45 and 46 of FIG. 8 are properly connected in parallel.

In the foregoing analyses, the simplified case has been assumed wherein all of the arrays are tuned to the same frequency of maximum response. Even where the central array has a maximum response frequency different from that of the outer arrays, the only difference in practice is a degree of change in the overall response curve; the proper orientation and interconnections remain the same, and the primary characteristics of the circuits illustrated in FIGS. 2—9 are preserved. An essential characteristic of the circuits of FIGS. 2, 4, 6 and 8 is the fact that the outer arrays are arranged such that the induced signal potentials in the two outer arrays are essentially the same in both amplitude and phase for the selected operating frequency range; consequently, those patterns have their outer arrays interconnected in parallel. Similarly, the filters of FIGS. 3, 5, 7 and 9 are arranged such that, within the selected frequency range, the induced potentials in the outer arrays add constructively when the outer arrays are interconnected in series. While in the series case it is not usually as necessary that the magnitude of the induced potentials be the same, the necessary identity of phase is secured in any event.

The filter of FIG. 11 as drawn with full lines but with electrode 76 removed serves further to illustrate that perfect physical symmetry is not a necessity. Even with that change, as demonstrated during the discussions of both FIGS. 10 and 11, the primary characteristic of constructive signal addition in the outer arrays is still obtained. Only the overall signal response is affected as a matter of degree for signals of frequencies removed from the design-center frequency. Analogously for series interconnection of the outer arrays, for example the filter of FIG. 5, the removal of the right hand electrode 84 from central array 37 does not affect the principal characteristic that constructive addition takes place in the desired frequency range in outer arrays 35 and 36, although the removal of electrode 84 renders the overall arrangement asymmetrical in a physical sense.

Having analyzed the operation and demonstrated the technical reasons for each of the particular arrangements of FIGS. 2—9 in terms of the phases and amplitudes of the waves and signals involved, it is of interest to observe certain physical relationships that exist in the illustrated embodiments. Returning first to FIG. 2, in which outer arrays 21 and 22 are connected in parallel and central array 20 has an odd number of electrodes, it is seen that one of the outer arrays is disposed to define a transformation of the other outer array by rotation in the plane of the wave-propagating surface about the geometrical center of the central array and an inversion about a line in that plane perpendicular to the teeth. It will also be seen that the same rotation and inversion occurs in FIG. 6 which is another parallel case with an odd number of electrodes in the central array.

FIGS. 3 and 7 exemplify a second general situation wherein the central arrays are still composed of an odd number of electrodes but in which the outer arrays are interconnected in series. Here, the arrangement is such that one of the outer arrays is disposed to define a simple rotation again in the plane of the wave-propagating surface about the geometrical center of the central array; in this case, there is no concurrent inversion. That same manner of rotational transformation is applicable to the parallel cases of FIGS. 4 and 8 wherein the central arrays have an even number of electrodes. Finally, the series cases of FIGS. 5 and 9, both of which have an even number of electrodes in the central array, are like FIGS. 2 and 6 in that one of the outer arrays is disposed to define an inversion together with a rotation as both previously were defined.

Also of interest by way of summary observation is the characterization that a central array composed of an odd number of electrodes, when energized, launches oppositely directed like-phased waves, while a central array with an even number of electrodes launches oppositely directed antiphased or counter-phased waves; in each case, referred to the center of the array. That is, the waves respectively are of like phase or are in counter phase at the same distances away from the central array.

Figure 12:
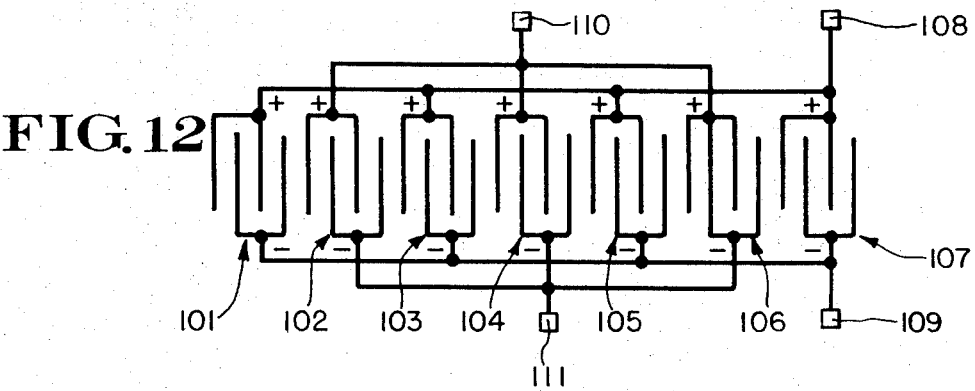
FIGS. 12—14 are schematic diagrams of still additional acoustic-filter embodiments.
Figure 13:
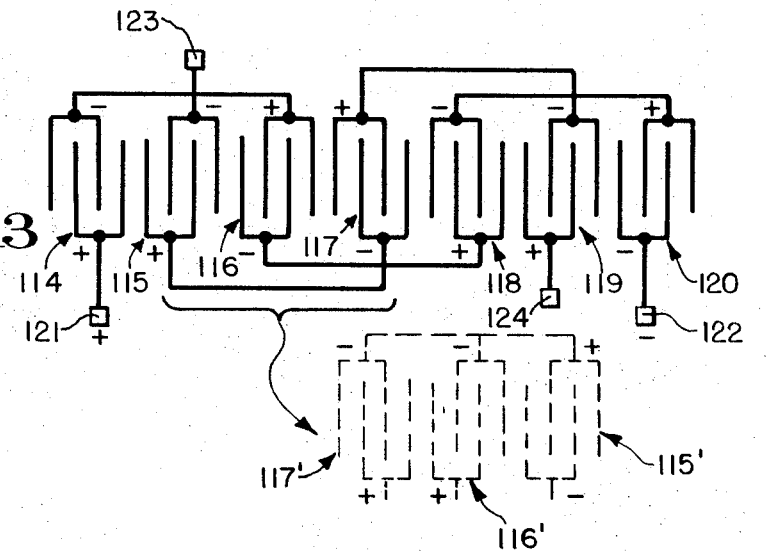
Figure 14:
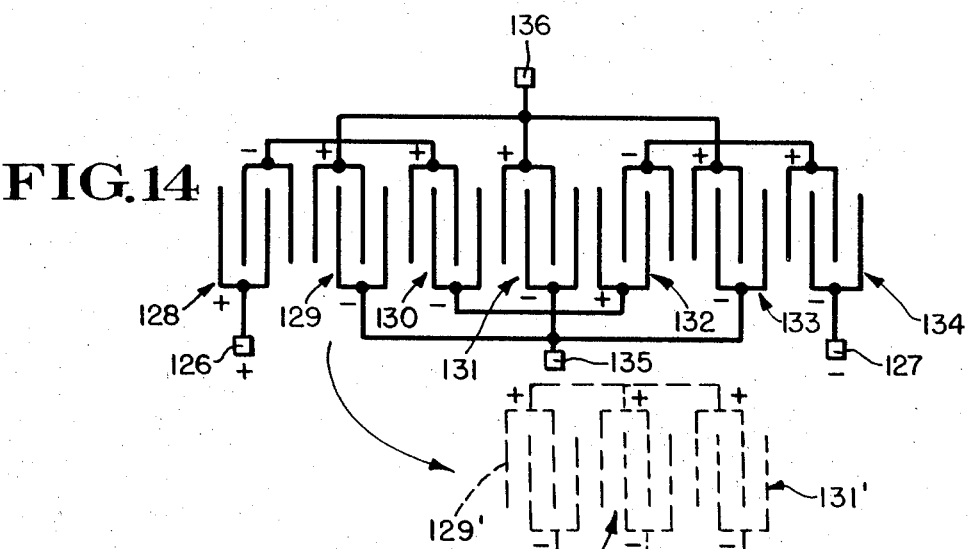

Further implementing the basic concepts demonstrated by FIGS. 2—9 are the somewhat more sophisticated filters of FIGS. 12—14. In each of these devices, the entire overall pattern is made up of a series of equal-spaced electrodes that, for illustration, are interconnected into segments that form a succession of individual arrays. Thus, the filter of FIG. 12 has a succession of arrays 101—107. Arrays 101, 103, 105 and 107 are connected in parallel between terminals 108 and 109, while arrays 102, 104 and 106 are connected in parallel between terminals 110 and 111.

Although either set of terminals may serve to receive the input signals with the other delivering output signals, it is for convenience assumed that the input signals are applied between terminals 108 and 109 as a result of which each of transducers 101, 103, 105 and 107 serves as a transmitter that launches two surface waves individually traveling in opposite directions. The intervening or interleaved transducers 102, 104 and 106 function as receiving transducers to develop parallel output signals.

Directing attention first to the combination of transducers 102, 103 and 104, the configuration of that set of transducers is essentially the same as that shown and described with respect to FIG. 4. Therefore, receiver transducers 102 and 104 operate as "outer" arrays connected in parallel to develop an output signal between terminals 110 and 111. Next looking at the set of transducers 104, 105 and 106, it is again seen that the central transducer 105 produces signals of equal phase and amplitude induced across transducers 104 and 106 that once more are paralleled in the manner of FIG. 4 also to develop an output signal between terminals 110 and 111. Because of the identity in structure and arrangement of these two sets of transducers, all of the signals developed across transducers 102, 104 and 106 are constructively combined in their appearance between terminals 110 and 111.

The same analysis applies to the end set of transducers 101 and 102 and the other end set of transducers 106 and 107, except that in these cases only the waves traveling in a direction inwardly of the overall series of arrays are effectively utilized. It is assumed for present purposes that the waves respectively launched outwardly of the overall arrangement from transducers 101 and 107 are either attenuated or coherently scattered so that they are not permitted to be reflected from the end surface of the supporting substrate and returned within the arrays with an interfering phase relationship. Thus, each of receiving transducers 102, 104 and 106 primarily receives surface waves launched to it from two neighboring input transducers. In practice, a degree of signal interaction is also present with respect to waves launched by the parallel-interconnected input transducers located further away, but such effects are comparatively small because the surface waves launched by the other input transducers are attenuated in their greater travel and have had to pass through an additional receiving transducer that absorbs the primary portion of the energy in such waves. Also in practice, each individual transducer typically has many more, say between 20 and 100, electrodes than illustrated; consequently, the effect of direct interaction between the two adjacent electrodes of each adjacent pair of transducers may be neglected.

Nevertheless, when in a particular application the additional interaction of each output transducer with waves generated by one or more input transducers other than those immediately adjacent to that output transducer is found undesirably to affect the overall filter response, such additional interaction can be avoided by employing the teachings of the aforementioned parent application. To that end, all of the energy transmitted by an input transducer toward an output transducer is converted into electrical energy in the latter by tuning out the clamped capacity $C_o$ with an inductor connected across the output transducer together with termination of the output transducer into an optimum load. By so resonating and terminating each of receiving transducers 102, 104 and 106 in FIG. 12, nearly all of the energy transmitted in the form of surface waves by the individual transducers coupled between terminals 108 and 109 is absorbed by the output transducers. Only the wave energy transmitted to the right of transducer 107 and to the left by transducer 101 is lost.

Stated more generally, then, for a system having N individual transmitting transducers and N–1 receiving transducers, the transmitting transducers transmit a total of 2N waves. Of those, a total of 2N–2 of those waves are absorbed by the receiving transducers and only two are lost. Consequently, the theoretical insertion loss can be shown to be 10 log 2N/2N–2. The latter equation reveals that, for the illustrated case of FIG. 12 in which N=4, the insertion loss is 1.2 db. This compares favorably with an optimum insertion loss of 3 db. for the filters of FIGS. 2—9 and thus demonstrates a primary advantage of utilizing a plurality of interleaved electrode arrays as embodied in FIG. 12.

Moreover, when a condition of optimum loading can be maintained over the desired frequency range, the selectivity of the filter of FIG. 12 is the same as that which is determined by the selectivity of any single transducer. But even in the case where optimum loading cannot be met, the efficiency generally will still be above that of the simpler three-array patterns of the earlier figures, even though the shape of the selectivity curve is affected in some degree.

Contrasting with the paralleled arrangements of input and output transducers in FIG. 12, FIG. 13 features series interconnection of the alternate individual transducers in the overall chain. Thus, the filter in FIG. 13 is composed of a succession of individual four-electrode transducers 114, 115, 116, 117, 118, 119 and 120. One set of transducers 114, 116, 118 and 120 are interconnected in one series combination, while the remaining and alternately disposed transducers 115, 117 and 119 are separately interconnected in another series combination. The even-numbered series of arrays are in turn connected between terminals 121 and 122, while the odd-numbered series of arrays are connected between terminals 123 and 124.

Assuming the input across terminals 121 and 122 of a signal at a frequency at least close to the frequency of maximum response of the individual arrays, the applied potential divides equally between what are then transmitting transducers 114, 116, 118 and 120. Also assuming an instantaneous signal polarity as between terminals 121 and 122 as indicated, the series interconnection of these arrays effects a distribution of individual polarities as shown by the polarity signs immediately above and below each of these individual transducers. That is, the signals developed across each of the individual transmitting transducers are constructively in phase in the series combination.

Following generally the same kind of analysis as was applied above with regard to FIGS. 2—9, it can be shown that the signal potentials induced in receiver transducers 115, 117 and 119 add constructively in their series combination between output terminals 123 and 124. To this end, it is first to be observed that the set of transducers 117, 118 and 119 is essentially the same as in the case of FIG. 5, consistent with the interconnection of transducers 117 and 119 in series for constructive addition of their individual signal potentials.

Noting next the set of transducers 115, 116 and 117, it can be seen that this set resembles the just-discussed set of arrays 117, 118 and 119 if rotated by 180° in the plane of surface wave propagation. For convenience, such a rotated set 117', 116' and 115' is depicted in dashed lines below the combination of transducers 117, 118 and 119. Recalling that the signal potential applied across each of the transmitter transducers is the same, the potential developed across transducer 118 is the same as that developed across transducer 116'. Physical inspection reveals that the utmost left electrode of transducer 116' exhibits a potential having a phase opposite that of the corresponding electrode in transducer 118; the same comment applies with respect to all other corresponding electrodes. Hence, the surface waves hypothetically produced by transducer 116' are 180° out of phase with those produced by transducer 118. Now comparing corresponding receiver transducers 117 and 117', and also comparing corresponding receiver transducers 119 and 115', the mutually counterphased surface waves are seen to produce equal potentials across each of transducers 115', 117', 117 and 119 by reason of the identity of construction and spacing. But the potentials developed across transducers 115' and 117' have an inverted assumed positive direction of polarity, or inversion in phase, as compared with the potentials developed across the corresponding ones of transducers 117 and 119. Transforming these results by rotation back to the actual configuration, it follows that the induced voltages across transducers 115, 116 and 117 are individually of such polarities as properly to enable the depicted series interconnections for the attainment of constructive signal addition. Continued analysis in this manner together with comparison to the simpler versions of the earlier figures serve to complete the operational analysis of the overall FIG. 13 filter.

Generally speaking, the arrangement of FIG. 13 has the same properties as that of FIG. 12 insofar as efficiency and selectivity are concerned. However, the impedance level of the circuit of FIG. 13 is much higher than that of FIG. 12 for the case in which the individual transducers are the same in both figures. This occurs because the comparative ratios of impedance are approximately in accordance with the quantity $N^2$, where N is the number of segments or individual arrays into which an overall transmitter or receiver is divided.

Carrying these examples of the use of interleaved receiver and transmitter transducer arrays one step further to exemplify the availability of even more variations, the filter in FIG. 14 interconnects between input terminals 126 and 127 the series combination of transducers 128, 130, 132 and 134. Interleaved between those transducers and connected in parallel between output terminals 135 and 136 are transducers 129, 131 and 133. By reason of the impedance properties discussed with regard to FIG. 13, the series combination of the input transducers produces a high input impedance, while the parallel combination of the output transducers results in the presentation of a low output impedance.

In operation of the FIG. 14 filter, the application of an input signal potential across terminals 126 and 127 results in a division of the applied signal potential equally over transducers 128, 130, 132 and 134 with the individual instantaneous polarities across each of those transducers being indicated for the assumed applied potential polarity. Again, the subcombination or set of individual transducers 129, 130 and 131 functions in a manner the same as that discussed with regard to FIG. 4, achieving constructive signal addition in transducers 129 and 131 by reason of their parallel interconnection. Shifting that combination below and to the right where it is denoted as composed of transducers 129', 130', and 131' for purposes of illustration, it is readily compared with the next set of transducers 131, 132 and 133. It is seen that the only difference is that arrays 130' and 132 have their respective electrodes connected at opposite ends; nevertheless, the individual electrode polarities are the same. Consequently, it is apparent that all of the receiving transducers 129, 131 and 133 have the same orientation of signal potential polarity and thus properly are connected in parallel for constructive signal addition. As before, the same analysis holds for what may be termed the incomplete end sections. Like in the case of FIGS. 12 and 13, the overall pattern of FIG. 14 has a frequency characteristic that, particularly when the filter is properly tuned and terminated, exhibits a comparatively high efficiency.

In each of FIGS. 12, 13 and 14, the basic transducer segments have had an even number of stripes and the teeth spacing of adjoining transducers is equal to the spacing of the teeth and may, for example, be one-half the acoustic surface wavelength. In the same manner as in the case of the variations between the filters of FIGS. 2—9, analogous interleaved-transducer filters can employ basic transducer sets having an odd-number of electrodes or combinations of even-number and odd-number sets, and the transducer spacings also may be varied. Such variations in transducer spacing can in some cases be advantageous in compensating for interaction between adjoining transducer segments.

In those cases where perfect matching and tuning is achieved, the spacing between receiver and transmitter transducers generally in arbitrary. As before, where such matching and tuning are other than optimum, the effects of the wave contributions from a plurality of transmitting transducers on each given receiver transducer, as well as differences in spacing, will be found to have an effect in terms of degree upon both overall frequency response and efficiency. It is particularly to be noted that, in all of the examples, one transducer or set of transducers has been utilized in a transmitter function with the others serving as receivers; by the principles of reciprocity, these functions can be reversed in all cases.

In contrast with the arrangements of FIGS. 2—9, the filters of FIGS. 12—14 do have crossed interconnecting leads at several places. These crossings may be accomplished either by the use of external jumpers or by first depositing one lead, then depositing a layer of insulation thereover and finally depositing a second and crossing lead. In spite of the slight increased capacitance introduced by such lead crossings, the interleaved filter arrangements are advantageous in that the insertion loss obtainable is reduced generally in proportion to the increase in the number of interleaved patterns.

A number of different arrangements have been shown for situating a pair of outer transducers about a central array in a manner such that electrical signals on the outer arrays are cumulatively correlated or added. At the same time, the different arrangements permit interconnection of the outer arrays and the connection of all of the arrays to other devices or circuitry with a minimum of difficulty and lead crossings. As has been demonstrated in detail, the layouts of the arrays follow certain simple general rules in order to obtain all of the advantageous objectives.

Although particular embodiments of the present invention have been shown and described, it will be obvious to those skilled in the art that changes and modifications may be made without departing from the invention in its broader aspects. Accordingly, the aim in the appended claims is to cover all such changes and modifications as fall within the true spirit and scope of the invention.

I claim:

1. In an acoustic filter having an acoustic-wave-propagating medium, a central surface-wave transducer actively coupled to a first surface portion of said medium and a pair of outer surface-wave transducers actively coupled individually to respective second and third surface portions of said medium mutually spaced in opposite directions from said first portion with each of said transducers composed of interleaved combs of conductive electrodes mutually spaced apart effectively by one-half the approximate wavelength of transmitted signals, the improvement comprising:
   means for interconnecting said outer transducers;
   connecting means for coupling input and output signals to and from said transducers;
   and the combs of said outer transducers being mutually arranged, relative to said central transducer, such that surface waves propagating between said central transducer and one of said outer transducers create electrical signals cumulatively phase-correlated with electrical signals created by surface waves propagating between said central transducer and the other of said outer transducers.

2. A filter as defined in claim 1 in which said outer transducers are connected in parallel, in which said central transducer has an even number of said electrodes and in which said one outer transducer is disposed to define a transformation of said other outer transducer by rotation in the plane of said surface about the geometrical center of said central transducer.

3. A filter as defined in claim 1 in which said outer transducers are connected in parallel, in which said central transducer has an odd number of said electrodes and in which said one outer transducer is disposed to define a transformation of said other outer transducer by rotation in the plane of said surface about the geometrical center of said central transducer and inversion about a line in said plane perpendicular to the teeth in said combs.

4. A filter as defined in claim 1 in which said outer transducers are connected in series, in which said central transducer has an odd number of electrodes and in which said one outer transducer is disposed to define a transformation of said other outer transducer by rotation in the plane of said surface about the geometrical center of said central transducer.

5. A filter as defined in claim 1 in which said outer transducers are connected in series, in which said central transducer has an even number of electrodes and in which said one outer transducer is disposed to define a transformation of said other outer transducer device by rotation in the plane of said surface about the geometrical center of said central transducer and inversion about a line in said plane perpendicular to the teeth in said combs.

6. A filter is defined in claim 1 in which said central transducer has an odd number of electrodes and interacts with oppositely directed like-phased waves, the electrodes of said outer transducers being disposed and distributed to define induced signal phase patterns effectively mutually symmetrical with respect to said central transducer.

7. A filter as defined in claim 1 in which said central transducer has an even number of electrodes and interacts with oppositely directed antiphased waves, the electrodes of said outer transducers being disposed and distributed to define induced signal phase patterns effectively mutually asymmetrical with respect to said central transducer.

8. A filter as defined in claim 1 which further includes a fourth surface-wave transducer actively coupled to a fourth surface portion on the opposite side of said one transducer from said central transducer and a fifth surface-wave transducer actively coupled to a fifth surface portion on the opposite side of said fourth transducer from said one transducer, said central and fourth transducers and said one and said fifth transducers being respectively interconnected.

9. A filter as defined in claim 8 in which said central and fourth transducers are interconnected in series and said outer and fifth transducers also are interconnected in series.

10. A filter as defined in claim 8 in which said central and fourth transducers are interconnected in parallel and said outer and fifth transducers also are interconnected in parallel.

11. A filter as defined in claim 8 in which said central and fourth transducers are interconnected in series and said outer and fifth transducers are interconnected in parallel.

12. A filter as defined in claim 1 in which said interconnecting means is disposed along said surface on at least one side of said transducers and said connecting means is disposed on said surface on both sides of said transducers.

13. An acoustic filter system comprising:
   a body of piezoelectric material propagative of acoustic surface waves;
   at least three surface wave interaction devices actively coupled to assigned surface portions of said body, separated from one another in the direction of surface wave propagation and individually comprising a pair of comblike electrode arrays with the electrode elements of one array interleaved with those of the other and spaced from one another by one-half the acoustic wavelength of a predetermined signal frequency to have a maximum interaction with said body at said predetermined frequency;
   means for applying a signal to the centrally located one of said devices to launch acoustic surface waves to said body;
   and means coupled to the remaining pair of interaction devices for deriving from the launched acoustic surface waves phase correlated and cumulative energy for application to a load.

14. An acoustic filter system in accordance with claim 13 in which said interaction devices have maximum interaction with said body at a common predetermined frequency.